United States Patent
Chan et al.

(10) Patent No.: US 9,942,332 B2
(45) Date of Patent: Apr. 10, 2018

(54) GEOLOCATION SAFETY AWARENESS

(71) Applicant: Yahoo!, Inc., Sunnyvale, CA (US)

(72) Inventors: Chris Chan, Santa Clara, CA (US);
Shivakumar Ningappa, Milpitas, CA (US); Shatakshi Goyal, Santa Clara, CA (US); Katrina Kimball Clark Tempero, San Mateo, CA (US); Yu-Chin Tai, Taipei (TW); Ameya Barsode, San Jose, CA (US); Clarence Lok Him Leung, Mountain View, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

(21) Appl. No.: 14/539,324

(22) Filed: Nov. 12, 2014

(65) Prior Publication Data
US 2016/0134644 A1   May 12, 2016

(51) Int. Cl.
*G06F 7/04* (2006.01)
*H04L 29/08* (2006.01)
*H04L 29/06* (2006.01)

(52) U.S. Cl.
CPC ............ *H04L 67/18* (2013.01); *H04L 63/083* (2013.01)

(58) Field of Classification Search
CPC . G06F 21/556; G06F 21/577; H04L 63/1416; H04L 63/1433; G01S 19/16; G01S 19/17
USPC .......................................................... 726/17
See application file for complete search history.

(56) References Cited

U.S. PATENT DOCUMENTS

| | | | | |
|---|---|---|---|---|
| 8,451,983 B2* | 5/2013 | Hulls | ..................... | G06Q 10/00 210/652 |
| 9,014,661 B2* | 4/2015 | deCharms | ............. | H04W 4/021 348/14.02 |
| 9,027,076 B2* | 5/2015 | Roach | ................... | H04L 63/107 726/1 |
| 2008/0094230 A1* | 4/2008 | Mock | ...................... | G08B 1/08 340/573.4 |
| 2008/0311880 A1* | 12/2008 | Copley, III | .......... | G06Q 10/107 455/404.1 |
| 2011/0046920 A1* | 2/2011 | Amis | ...................... | G01S 19/16 702/181 |
| 2013/0183924 A1* | 7/2013 | Saigh | .................... | H04W 4/025 455/404.2 |
| 2013/0305369 A1* | 11/2013 | Karta | .................. | H04L 63/1416 726/23 |

* cited by examiner

*Primary Examiner* — Samson Lemma
(74) *Attorney, Agent, or Firm* — Cooper Legal Group, LLC

(57) ABSTRACT

A method and/or technique for geolocation safety awareness is provided herein. When a user, having a client device, travels to a location, threats associated with that location may not be known to the user. To determine a safety of the location, the location of a client device may be determined. A search for safety information about the location may be performed, and a threat level may be determined based upon the safety information. When the threat level exceeds a threat threshold, a security operation may be performed. The security operation may comprise presenting a warning notice to the user and/or activating a security timer.

20 Claims, 9 Drawing Sheets

GEOLOCATION SAFETY AWARENESS

BACKGROUND

When a user travels to a location for the first time, the user may be unaware of threats (e.g., security threats, health epidemics, weather dangers, etc.) associated with the location. With the increased prevalence of civil unrest, terrorism, military action, disease outbreaks, etc., access to information about when and/or where it is safe to travel may be helpful in keeping the user safe. Further, threats associated with a location may not be static. For example, changes in the weather may alter a threat level associated with the location. As another example, an upheaval in civil unrest and/or a disease outbreak may temporarily increase a threat level associated with the location. Thus, due to the fluid nature of threats, a user's perception regarding the safety and/or perceived threats of a previously visited location may not match current realities associated with the location.

SUMMARY

In accordance with the present disclosure, a baseline security state for a user may be determined for a home region of the user. The baseline security state may be determined based upon one or more types of threats, and a threat threshold(s) may be set based on the baseline security state. A baseline security state represents the user's day-to-day experience with threats and the threat threshold(s) corresponds to a quantitative representation of the baseline security state for the one or more types of threats. For example, a user in a country with continuous civil unrest may, on a day-to-day basis, be more accustomed to gun violence than a user in a country with little-to-no civil unrest and thus the threat threshold for the user in the country with continuous civil unrest may be different than a threat threshold for a user in a country with little-to-no civil unrest. In some embodiments, a plurality of threat thresholds may be set for various types of threats. For example, a first threat threshold may be related to health risks and may be based upon the probability of the user acquiring a type-1 contagious disease within his/her home region and a second threat threshold may be related to security risks and may be based upon the probability of the user getting robbed, kidnapped, or otherwise assaulted within his/her home region.

A location of a client device may be determined (e.g., to determine a present location of the user associated with the client device relative to the home region). If the client device is not located within the home region of the user, a search for safety information about the location may be performed and one or more threat levels may be determined based upon the safety information. The threat level(s) may correspond to a quantitative representation of the one or more types of threats at the present location. If a threat level for the location is determined to exceed the threat threshold (e.g., for an associated type of threat), a security operation may be performed with respect to the user. Where multiple threat levels are determined and/or multiple threat thresholds are set, a threat level for the location is compared to a corresponding threat threshold (e.g., for a same type of threat) to determine if the threat level exceeds the threat threshold.

In some embodiments, the security operation corresponds to presenting a warning notice on the client device. The warning notice may comprise a type of threat, a route away from a threat, and/or a recommendation on how to react to the threat. In some embodiments, such a security operation is performed when a difference between the threat level and the threat threshold is less than a first threshold (e.g., when the threat level corresponds to a moderate increase in a possible threat relative to the home region).

In some embodiments, the security operation may activate a security timer used to intermittently and/or periodically evaluate the safety of the user of the client device. For example, when the security timer is activated, a check-in time for the user is established. If a check-in notification is not received by the check-in time, an emergency contact may be notified. In some embodiments, such a notification to the emergency contact may include a last known location of the client device. In some embodiments, the security operation may activate the security timer when the difference between the threat level and the threat threshold is greater than the first threshold (e.g., when the threat level corresponds to a substantial increase in a possible threat relative to the home region).

In some embodiments, the security timer is associated with a check-in passcode and an emergency passcode. In such embodiments, the check-in notification is received when the check-in passcode has been input into the client device by the check-in time. If, instead, an emergency passcode is entered (e.g., because the user is being forced by another person to enter a passcode in an attempt to check-in and avoid having an emergency contact notified), the emergency contact is notified.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
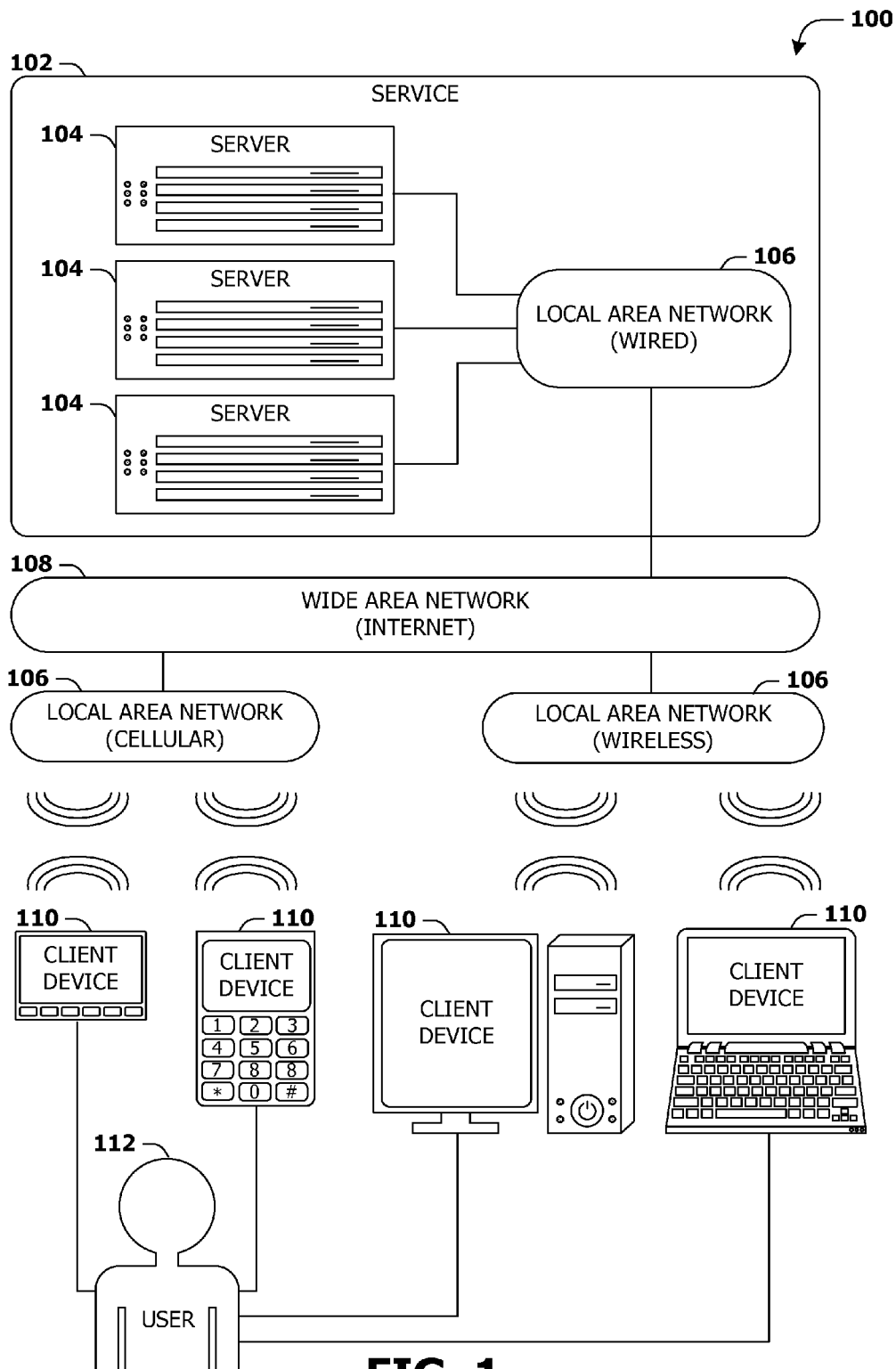
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
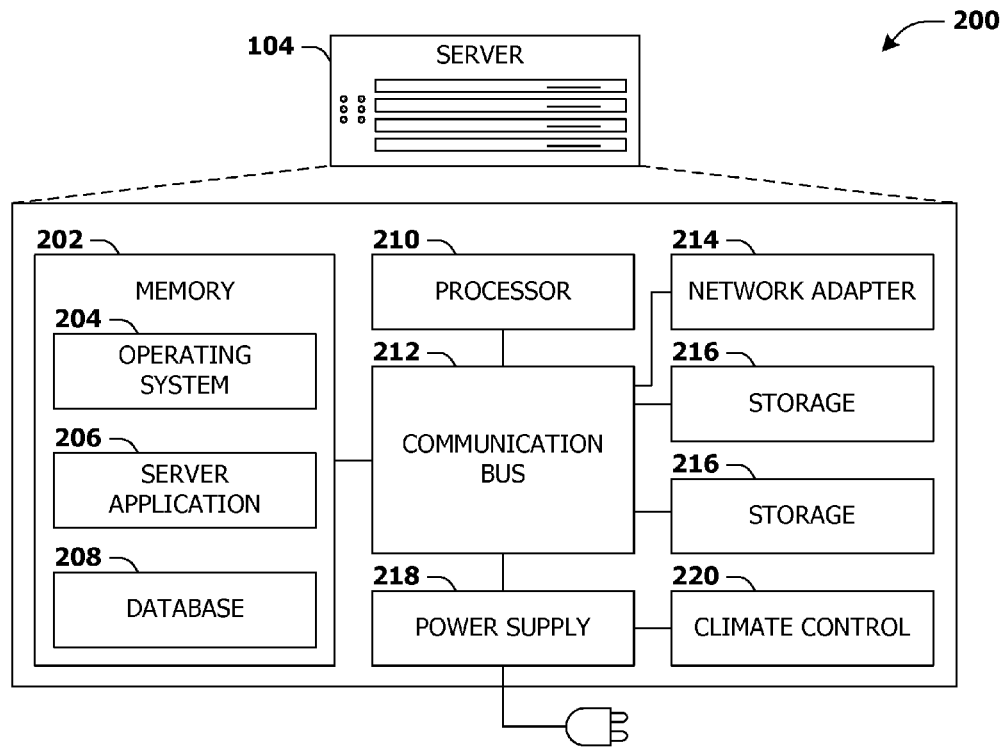
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
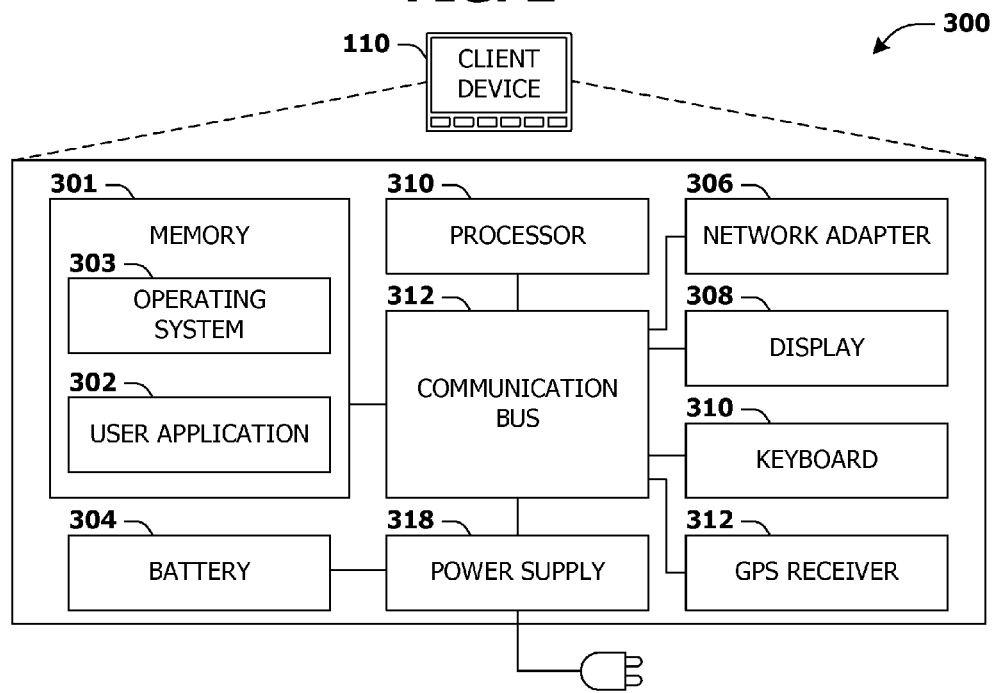
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for geolocation safety awareness are provided herein. When a user travels to a new location, the user may be unaware of threats associated with the new location. With the prevalence of civil unrest, terrorism, military action, disease outbreaks, weather-related dangers, etc., access to information about when and/or where it is safe to travel may be helpful in keeping the user safe. Moreover, a threat level associated with a location may change due to the dynamic nature of at least some of these threats. Therefore, a user may be unaware of present threat conditions for locations that the user has previously visited. Thus, the ability to reliably and quickly determine the safety of a location that the user is visiting, may increase the user's confidence and/or safety while travelling. Further, the ability to provide threat notifications in the context of a user's typical threats may help grab and/or maintain a user's attention. For example, user's in a region where assaults are common may become apathetic towards notifications if threats were assessed in absolute terms because the user is accustomed to living and/or working in a region where his/her life is constantly threatened. However, by establishing a baseline security state for a user in relation to his/her home region, notifications are merely provided when the threat level for a threat exceeds a threat threshold corresponding to the baseline security state. Further, the ability to create a check-in system when the user enters a location that is dangerous (e.g., because the threat level for the location exceeds a threat threshold set based upon a baseline security state of the user's home region), creates a mechanism that allows an emergency contact of the user to quickly respond and contact help for the user.

As used herein, a threat corresponds to a person, place, event, etc. that poses a safety risk to a user and/or property of the user. Such threats may be security related, weather related, health related, etc.

Figure 4:
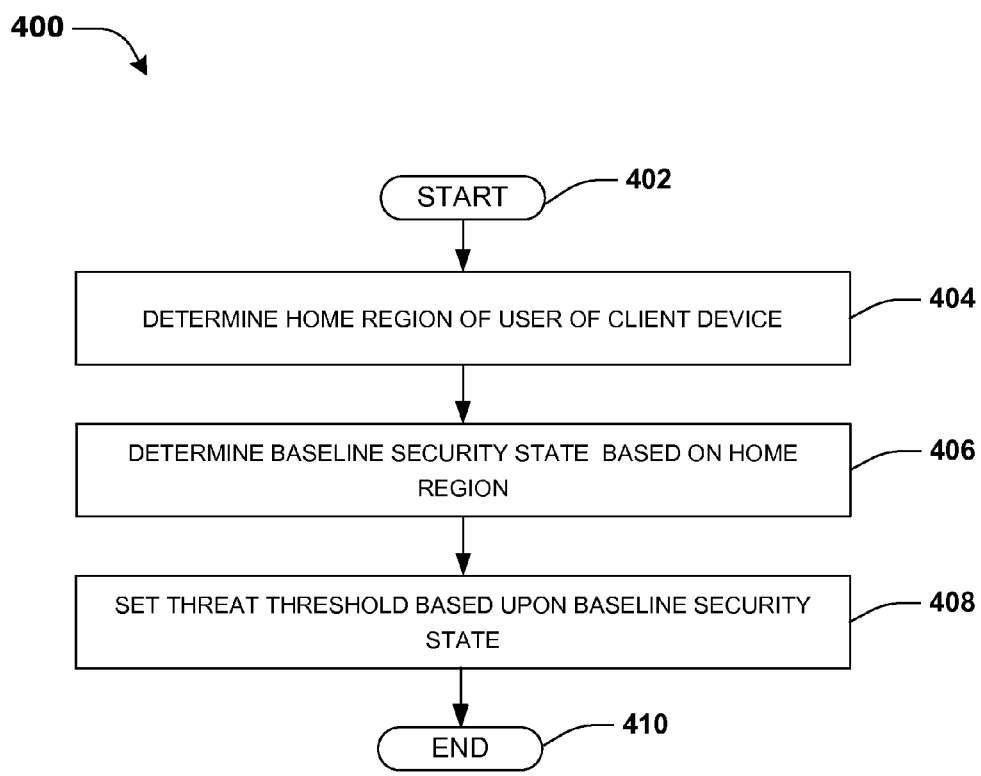
FIG. 4 is a flow chart illustrating an example method of geolocation safety awareness.

An embodiment of geolocation safety awareness is illustrated by an example method 400 of FIG. 4, wherein a baseline security state for a user is determined and/or a threat threshold for the user is set. At 402, the method 400 starts. At 404, a home region of the user of a client device may be determined. A user may input the home region into the client device and/or the client device may determine the home region of the user based upon where the user spends the majority of his/her time, a time zone set by the user, etc. At 406, a baseline security state for the user may be computed based upon the home region of the user. The baseline security state may attempt to quantify the user's experience with (e.g., or familiarity with) one or more types of threats based upon the home region of the user (e.g., to determine how accustomed the user is to the one or more types of threats). For example, a first user may reside in Crimetown, which has a high crime rate (e.g., a large number of murders, theft, etc.). Because this first user has been exposed to this type of threat, the user may be more situationally aware (e.g., more mindful of his/her surroundings) and/or may have more knowledge regarding how to avoid and/or handle crime-related threats than a second user living in Safetyville, which has a low crime rate. As another example, Safetyville may be experiencing a disease outbreak and thus the second user may be more situationally aware and/or have more knowledge regarding precautions to avoid disease transmission than the first user living in Crimetown and experiencing no disease outbreak.

In some embodiments, the baseline security state may be based on home information about the home region (e.g., a city, country, etc.) of the user. The home information may comprise a number of crimes per year/per capita in the home region, a number of incidents of civil unrest within a time period (e.g., a week, a month, etc.) in the home region, a typical and/or average government determined threat level for the home region (e.g., determined by the government of the home region of the user), typicality of disease outbreaks near the home region, present or forecasted inclement weather typical to the home region, etc. The home information may include information derived from police databases, disease control databases, state department databases, weather forecasts, news articles, social media, and/or other sources where information regarding possible threats within a specified proximity of the home region can be determined and/or where information from which possible threats can be inferred At 408, a threat threshold may be set based on the baseline security state. The threat threshold is configured to quantify a threat level at which a type of threat(s) becomes a perceived threat from the perspective of the user. In some embodiments, the threat threshold is equal to the baseline security state. In other embodiments, the threat threshold is above the baseline security threat. For example, if the baseline security state quantifies a threat of an assault at 25 (e.g., on a numerical scale between 0 and 100), the threat threshold may be set at 25 or may be set at 35 (e.g., because the user may tolerate a slightly higher possibility of being assaulted without feeling unsafe or without wanting to know that he/she may be at risk). As will be further described with respect to FIG. 5, this threat threshold may be used to determine whether to warn a user of a possible threat.

It may be appreciated that while the example method 400 merely describes setting one threat threshold, a plurality of threat thresholds may be set for various types of threats. For example, a first threat threshold may be set for security threats, a second threat threshold may be set for health threats, etc. In other embodiments, a single threat threshold may be set which is representative of an overall threat tolerance of a user (e.g., when considering security threats, health threats, etc.).

In some embodiments, the user may be configured to specify a threat threshold. For example, the user may specify that he/she would like to be warned about a possible threat if the threat level for the threat type exceeds his/her baseline security state by more than 5%. Thus, the threat threshold is set at 5% higher than the baseline security state. In other embodiments, the threat threshold may be set by default and/or based upon other considerations. At 410, the method 400 ends.

Figure 5:
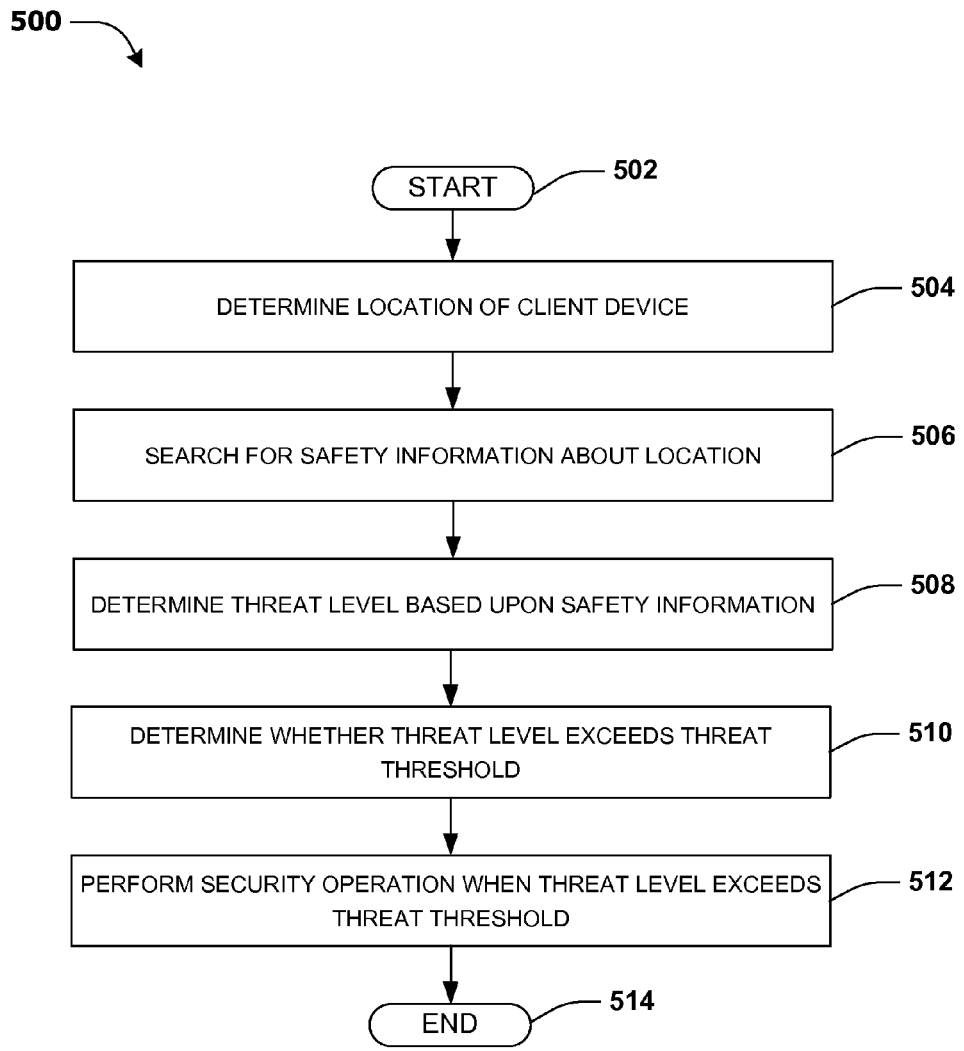
FIG. 5 is a flow chart illustrating an example method of geolocation safety awareness.

An embodiment of geolocation safety awareness is illustrated by an example method 500 of FIG. 5, wherein a security operation is performed if the user is located in an area of increased threats relative to his/her home region. At 502, the method 500 starts. At 504, a location of a client device may be determined. In some embodiments, the location may be determined by the client device using a global positioning system, a mobile phone network, a local area wireless network, or other geolocation component of the client device. In other embodiments, the location of the client device may be determined based upon manual input from the user.

At 506, a search may be performed to obtain safety information about the location and/or about a region within which the location is located (e.g., a city, country, specified radius, etc.). The safety information may comprise a number of crimes per year/per capita in the location, a number of incidents of civil unrest within a time period (e.g., a week, a month, etc.) in the location, a government determined threat level for the location (e.g., determined by the government of the home region of the user and/or the government of the location), known disease outbreaks near the location, present or forecasted inclement weather near the location, etc. The safety information may include information derived from police databases, disease control databases, state department databases, travel alert databases, weather forecasts, news articles, social media, and/or other sources where information regarding possible threats within a specified proximity of the location can be determined and/or where information from which possible threats can be inferred.

At 508, a threat level may be determined based upon the safety information. For example, the threat level may comprise a quantitative value, (e.g., 25) for a group of threats and/or for one or more types of threats. For example, a first threat level for assaults may be determined based upon the number of armed robberies, kidnapping, etc. within a first distance (e.g., one mile) from the location of the client device. A second threat level for violent civil unrest may be determined based upon how recently military action occurred within a second distance (e.g., 50 miles) of the location of the client device.

At 510, a determination is made whether the threat level for one or more types of threats exceeds the threat threshold for the type of threat(s) (e.g., where the threat threshold was set at 408 in FIG. 4). A threat level exceeding the threat threshold is indicative of the user being in a location where the user is experiencing a heightened threat, relative to what the user is accustomed to based upon his/her home region. For example, the weather surrounding the region may be more life threatening than the weather the user is accustomed to experiencing and thus the threat level for dangerous weather may exceed a threat threshold for dangerous weather.

When the threat level exceeds the threat threshold, a security operation may be performed at 512. The security operation may comprise presenting a warning notice on the client device and/or activating a security timer, for example. In some embodiments, the warning notice may notify a user regarding the type of threat associated with the threat level that exceeds the threat threshold, a route away from the threat (e.g., if possible), and/or a recommendation on how to react to the threat. The recommendation on how to react to the threat may include directing the user to leave the area, safety tips for how to manage the threat, etc.

In some embodiments, the security timer may be used to intermittently and/or periodically evaluate the safety of the user of the client device. For example, when the threat level exceeds the threat threshold, the user may be asked whether the user wishes to activate a security timer and/or the security timer may be programmatically activated (e.g., with little to no interaction by the user). In some embodiments, the security timer is programmatically activated when a difference between the threat level and the threat threshold is greater than a first threshold (e.g., indicating that the threat is severe in relation to the user's baseline experience with the type of threat).

Activation of the security timer may comprise setting a check-in time for the user. If the check-in time lapses before the user checks-in (e.g., by entering a check-in password or otherwise indicating that he/she is safe), an emergency contact for the user may be notified. The notification to the emergency contact may include a last known location of the client device and/or other information which may be relevant for assisting the emergency contact in finding the user and/or identifying authorities to assist in locating the user. For example, the notification may include information regarding a hotel the user is visiting, police and/or medical contacts for the location, etc. In some embodiments, the emergency contact may be a person experienced in handling the type of threat which the user is likely encountering (e.g., based upon the threat level). For example, the emergency contact may be a local police agency or local medical agency. Thus, the emergency contact may not be an entity the user engages with on a routine and/or personal level.

In some embodiments, the security timer may be associated with a check-in passcode and an emergency passcode. The emergency passcode may be a decoy password that may be entered if a user is forced into entering a passcode to deactivate the security timer. If the emergency passcode is entered, the security timer may be deactivated (e.g., to provide an impression that the user entered the check-in passcode) and the emergency contact may be notified. If the check-in passcode is received before the check-in time, the security timer may be deactivated. Further, in some embodiments, the emergency contact may be notified responsive to receiving one or more incorrect attempts to enter the check-in passcode. At 514, the method 500 ends.

Figure 6A:
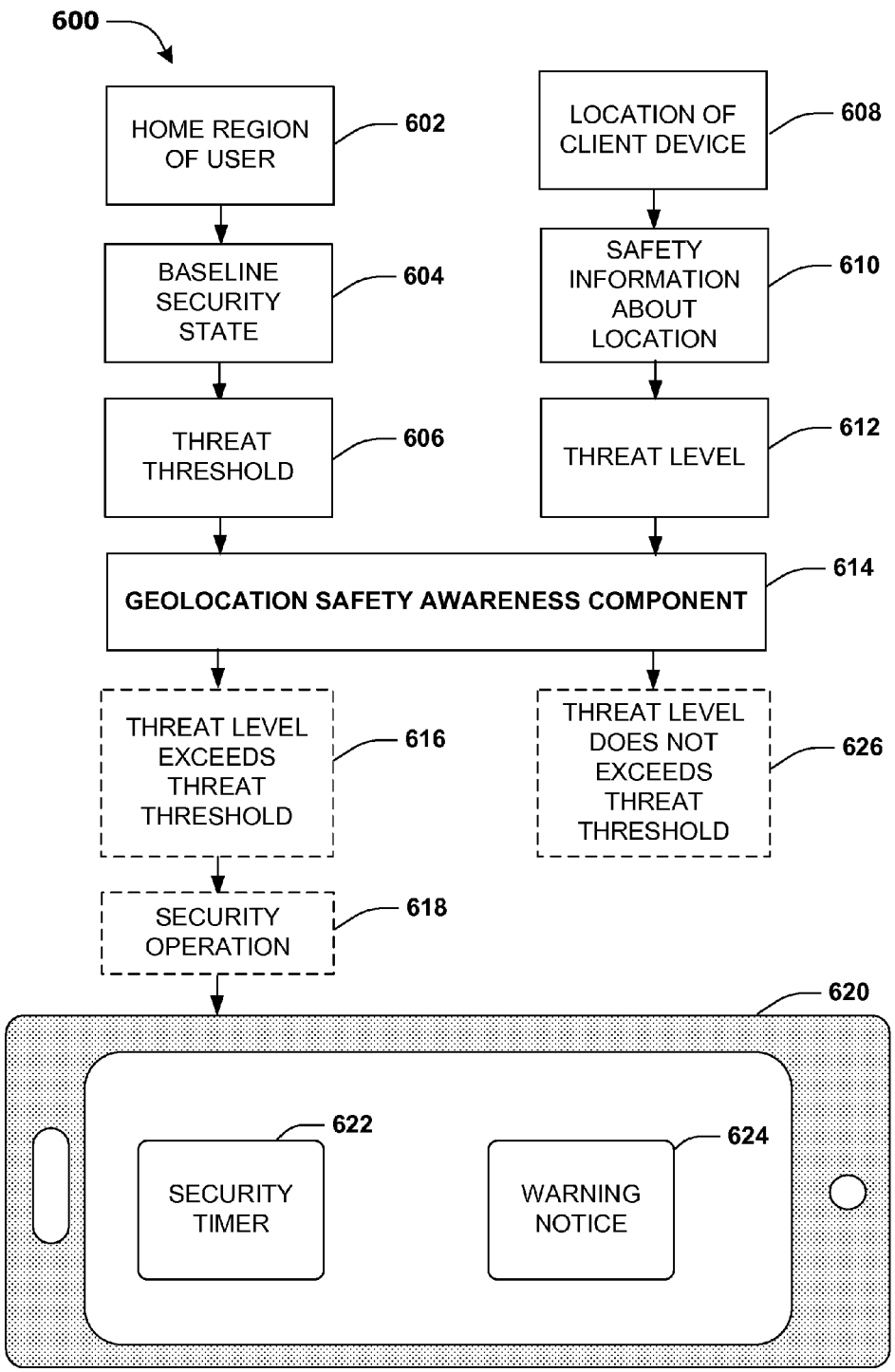
FIG. 6A is a component block diagram illustrating an example system for geolocation safety awareness.
Figure 6B:
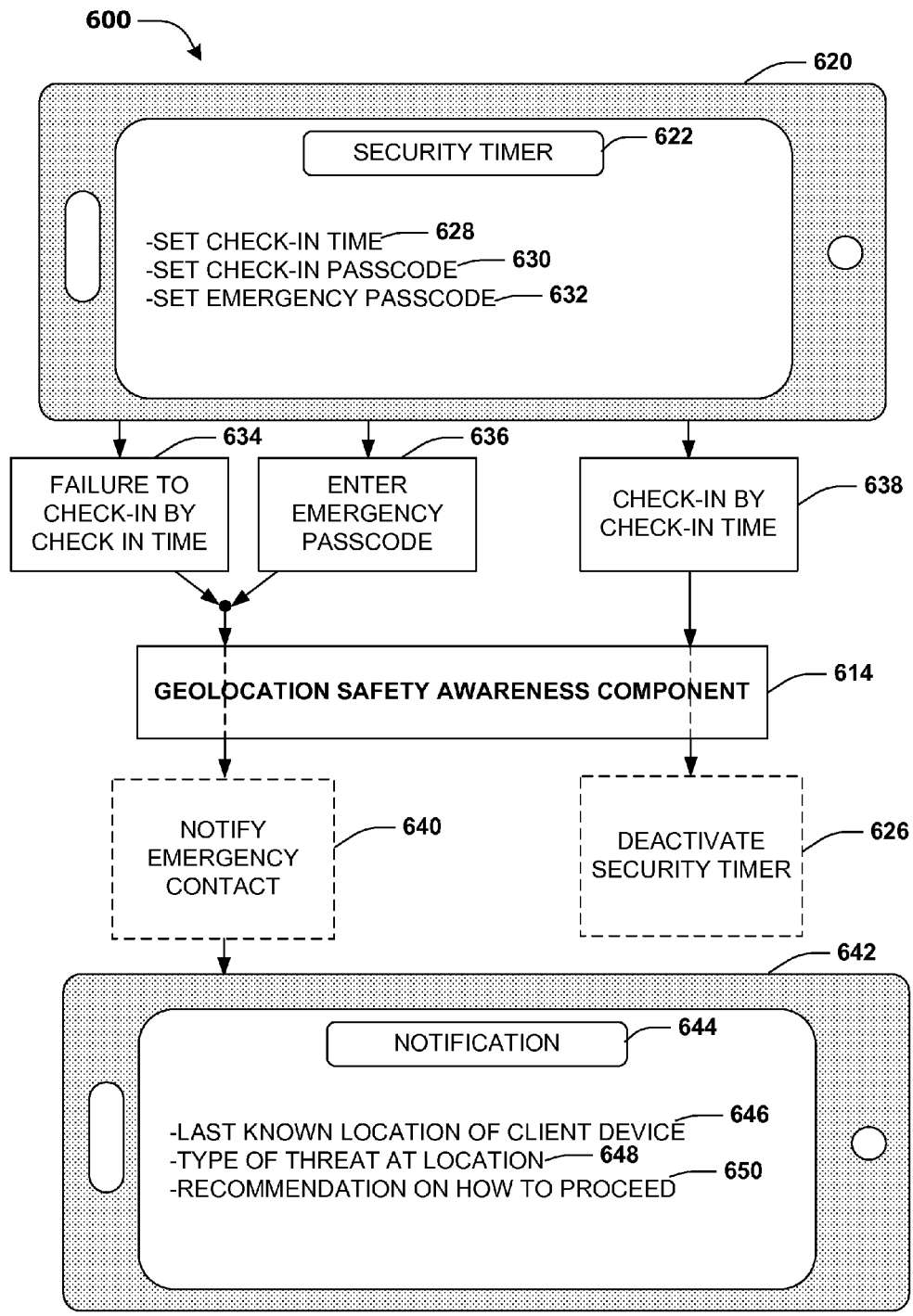
FIG. 6B is a component block diagram illustrating an example system for geolocation safety awareness, where a security timer is activated.
Figure 6C:
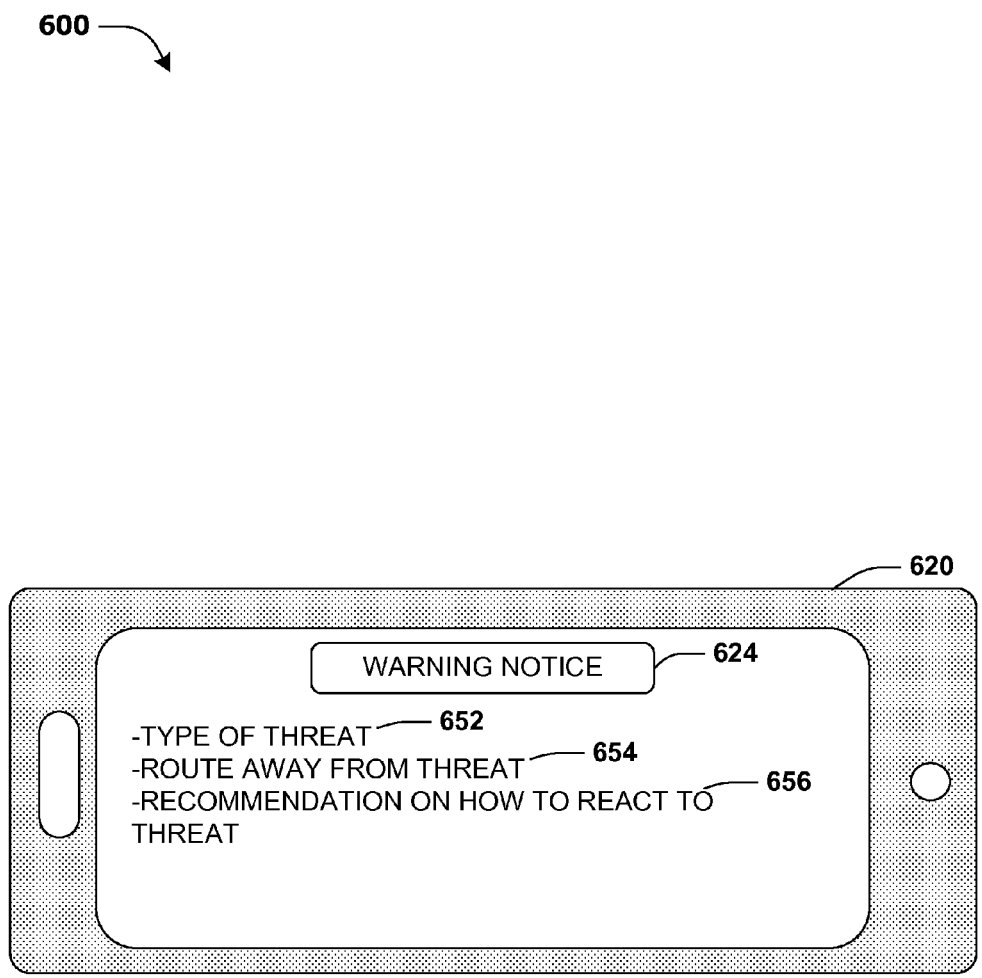
FIG. 6C is a component block diagram illustrating an example system for geolocation safety awareness, where a warning notice is presented.

FIGS. 6A-6C illustrate a system 600, comprising a geolocation safety awareness component 614 for geolocation safety awareness. FIG. 6A illustrates the geolocation safety awareness component 614 determining a threat level 612 of a location 608. A user on a client device 620 may have a home region 602 (e.g., where the user resides). The user may input the home region 602 into the client device 620 and/or the geolocation safety awareness component 614 may determine the home region 602 of the user. For example, the user may reside in Anytown, United States of Prosperity (USP). The geolocation safety awareness component 614 may determine a baseline security state 604 for the user based upon the home region 602 of the user and may determine a threat threshold 606 based upon the baseline security state 604.

The geolocation safety awareness component 614 may determine the location 608 of the client device 620, and responsive to the client device 620 being outside the home region 602 of the user, may search for safety information 610 about the location 608. The location 608 may comprise an area immediately near the client device 620, a city in which the client device 620 is located, and/or a country in which the client device 620 is located. The safety information 610 may include a number of crimes per year/per capita at the location 608, a number of incidents of civil unrest within a time period (e.g., a day, a week, and/or a month from a current time) at the location 608, a government determined threat level for the location 608 (e.g., as determined by the government of the home region of the user and/or the government of the location), a weather forecast, etc.

The geolocation safety awareness component 614 may determine the threat level 612 based upon the safety information 610. For example, the threat level 612 may comprise a numerical value score indicative of the probability that the user will experience a threat of a type associated with the threat level while at the location (e.g., or within a defined distance surrounding the location). For example, a first threat level may be determined for health threats and may be indicative of a probability that the user is likely to experience a health related issue that necessitates a hospital visit while visiting the location. A second threat level may be determined for security threats and may be indicative of a probability that the user is likely to experience an assault while visiting the location. The granularity of threats may be application specific. For example, security threats may be divided into multiple threat levels (e.g., a first threat level indicative of a probability of being murdered, a second threat level indicative of a probability of being kidnapped, a third threat level indicative of a probability of being robbed, etc.). In other embodiments, a single threat level may be determined for a location and may take into consideration multiple types of threats (e.g., health threats, security threats, weather threats, etc.).

The geolocation safety awareness component 614 is configured to receive the threat threshold(s) 606 corresponding to the home region of the user and the threat level(s) 612 corresponding to the present location of the user and is configured to determine whether that a threat level(s) 612 exceeds a threat threshold(s) 606. A threat level 612 may be determined to exceed 616 a corresponding threat threshold 606 when a numerical value of the threat level 612 exceeds a numerical value for the threat threshold 606, for example.

When the threat level 612 exceeds 616 the threat threshold 606, a security operation 618 may be performed. The security operation 618 may comprise activating a security timer 622 and/or presenting a warning notice 624 on the client device 620, for example.

FIG. 6B illustrates the geolocation safety awareness component 614 activating the security timer 622. The security timer 622 may be used to intermittently and/or periodically evaluate the safety of the user of the client device 620. The user and/or the client device 620 may activate the security timer 622. The geolocation safety awareness component 614 may activate of the security timer 622. The activation of the security timer 622 may comprise setting a check-in time 628 (e.g., between 10 minutes to 24 hours), setting a check-in passcode 630 and/or setting an emergency passcode 632. The check-in time 628 may comprise an interval of time, within which, the user may check-in. In some embodiments, the check-in time 628 or rather the security timer is maintained at a second device, different than the client device 620, to inhibit a malicious party from acquiring the client device 620 and disabling the security timer, for example. For example, in some embodiments, the security timer may be maintained (e.g., executed) in the cloud and/or on a server because such devices are typically persistent (e.g., always powered-on), maintain an internet connection, are frequently monitored for maintenance, and/or are configured to roll-over services and/or data to another device in the event of a failure/shut-down.

If the user fails 634 to check-in by the check-in time 628, the geolocation safety awareness component 614 may notify an emergency contact 640. The user may set the emergency contact 640 prior to travelling or while travelling. For example, if the user sets the check-in time 628 for 20 for 20 minutes, a failure 634 by the user to check-in before the 20 minutes has elapsed will result in the emergency contact 640 being sent a notification 644. In some embodiments, the security timer 622 may notify the user that the check-in time 628 may be about to be exceeded.

If the user checks in 638 by the check-in time 628, the geolocation safety awareness component 614 may deactivate 626 the security timer 622. If the user checks in 638 by the check-in time 628, the security timer 622 may be reset, responsive to the user still being in the location when the check-in 638 occurs. The reset may occur one or more times until a stopping criteria is satisfied (e.g., until the client device 620 leaves the location). The check-in passcode 630 may be required to check-in 638 and deactivate or reset the security timer 622. The emergency contact 640 may be notified responsive to one or more incorrect attempts to enter the check-in passcode 630. The check-in passcode 630 may prevent a person and/or persons, other than the user, from deactivating 626 the security timer 622. The user may enter 636 the emergency passcode 632 into the client device 620. The geolocation safety awareness component 614 may notify the emergency contact 640, responsive to the client device 620 receiving the emergency passcode 630.

The geolocation safety awareness component 614 my send the notification 644 to the emergency contact 640 on a first client device 642. The notification 644 may comprise a last known location of the client device 646, a type of threat at the location 648, and/or a recommendation on how the emergency contact 640 should proceed 650. The last known location of the client device 646 may include the last location at which the user checked in and/or a current location of the client device 620. The type of threat at the location 648 may comprise the safety information related to the threat and/or recent incidents where the threat has been manifested (e.g., where flooding occurred, where a robbery took place, etc. The recommendation on how to proceed 650 may include contact information for a relevant embassy, contact information for a local police department, etc.

FIG. 6C illustrates the geolocation safety awareness component 614 presenting the warning notice 624. The warning notice 624 may comprise a type of threat 652, a route away from threat 654, and/or a recommendation on how to react to the threat 656. For example, the type of threat 652 may comprise crime-related threat (e.g., assault, murder, robbery, etc.), a health-related threat (e.g., possible transmission of infection disease), a weather-related threat (e.g., possible tornado, hurricane, flooding, etc.), etc. The route away from the threat 654 may include one or more possible routes. The route away from the threat 654 may be presented where the area associated with the threat is small enough that the user may be able to avoid the area associated with the threat (e.g., an area where riots and/or protests are occurring) or where an area of safety is relatively near to the user (e.g., where a bomb shelter, a police station, an embassy, a hospital, etc., is nearby). The route away from the threat 654 may not be presented where a large area, such as a majority of a country has a high threat level (e.g., the country is at war with another country, is under threat of military action, and/or under a terrorist threat). The recommendation on how to react to the threat 656 may include directing the user to leave the area, travel to a bomb shelter, a police station, an embassy, etc. The recommendation on how to react to the threat 656 may include a recommendation on which of the one or more possible routes away from the threat 654 the user should take.

Figure 7:
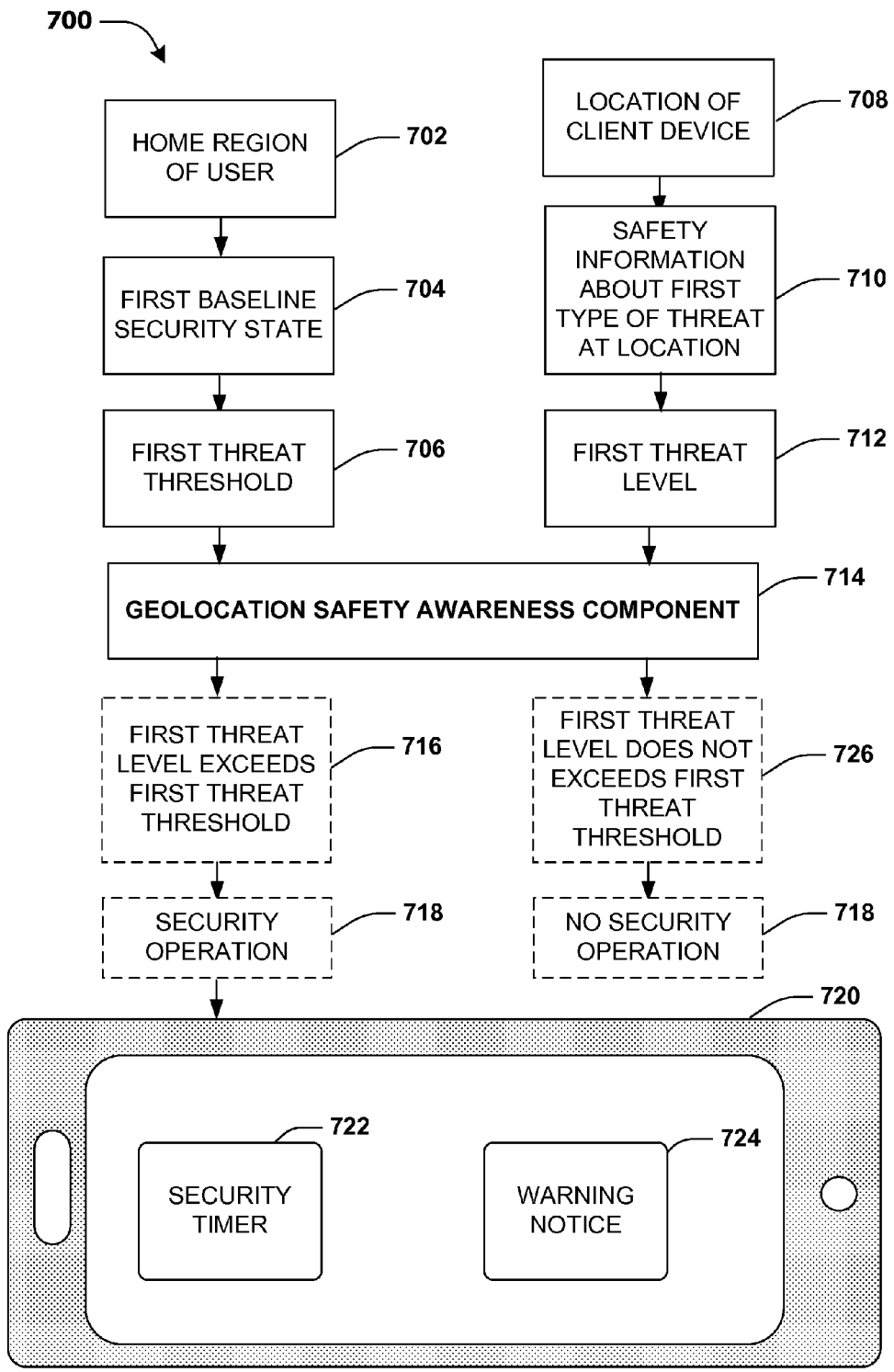
FIG. 7 is a component block diagram illustrating an example system for geolocation safety awareness, where a first type of threat is determined.

FIG. 7 illustrate a system 700, comprising a geolocation safety awareness component 714 determining a first threat level 712 of a location 708. A user on a client device 720 may have a home region 702 (e.g., where the user resides). The user may input the home region 702 into the client device 720 and/or the geolocation safety awareness component 714 may determine the home region 702 of the user. The geolocation safety awareness component 714 may determine a first baseline security state 704 for the user based upon the home region 702 of the user. The first baseline security state 704 may be determined based on a first type of threat. In an example, the first type of threat may comprise domestic threats, such as crime and/or civil disobedience. A second type of threat may comprise a different type of threat than the first type of threat. In an example, the second type of threat may comprise an external threat, such as likelihood of military action, likelihood of terrorist threat, etc. In an example, one or more additional types of threats may be contemplated.

The geolocation safety awareness component 714 may determine a first threat threshold 706 based upon the first baseline security state 704. The geolocation safety awareness component 714 may determine the location 708 of the client device 720, and responsive to the client device 720 being outside the home region 702 of the user, the geolocation safety awareness component 714 may search for safety information 710 about the first type of threat at the location 708. The location 708 may comprise an area immediately near the client device 720, a city in which the client device 720 is located, and/or a country in which the client device 720 is located. In an example, the safety information 710 may include crime rates, such as a number of crimes per year/per capita at the location 708, a number of incidents of civil unrest within a time period (e.g., a day, a week, and/or a month from a current time) at the location 708, etc. In an example, the safety information 710 about the second type of threat may include information about the location 708, such as a likelihood of terrorist attack and/or likelihood of military incursion.

The geolocation safety awareness component 714 may determine the first threat level 712 based upon the safety information 710. For example, the first threat level 712 may be based on the first type of threat, such as a number of murders within a first distance (e.g., a half mile) from the location 710 of the client device 720. For example, a second threat level may be based on the second type of threat, such as a likelihood of military action or a likelihood of terrorist action within a second distance (e.g., 200 miles) of the location 710 of the client device 720.

The geolocation safety awareness component 714 may determine that the first threat level 712 exceeds 716 or does not exceed 726 the first threat threshold 706. The threat level 712 may be determined to exceed 716 the first threat threshold 708. A security operation 718 may be performed when the first threat level 712 exceeds 716 the first threat threshold 706. No security operation 719 may be performed where the first threat level 712 does not exceed 726 the first threat threshold 706. The security operation 718 may be performed when the first threat level 712 does not exceed 726 the first threat threshold 706, but when the second threat level does exceed a second threat threshold. The security operation 718 may comprise activating a security timer 722 and/or presenting a warning notice 724 on the client device 720, in the same manner as described above with regard to FIGS. 6B-6C.

Figure 8:
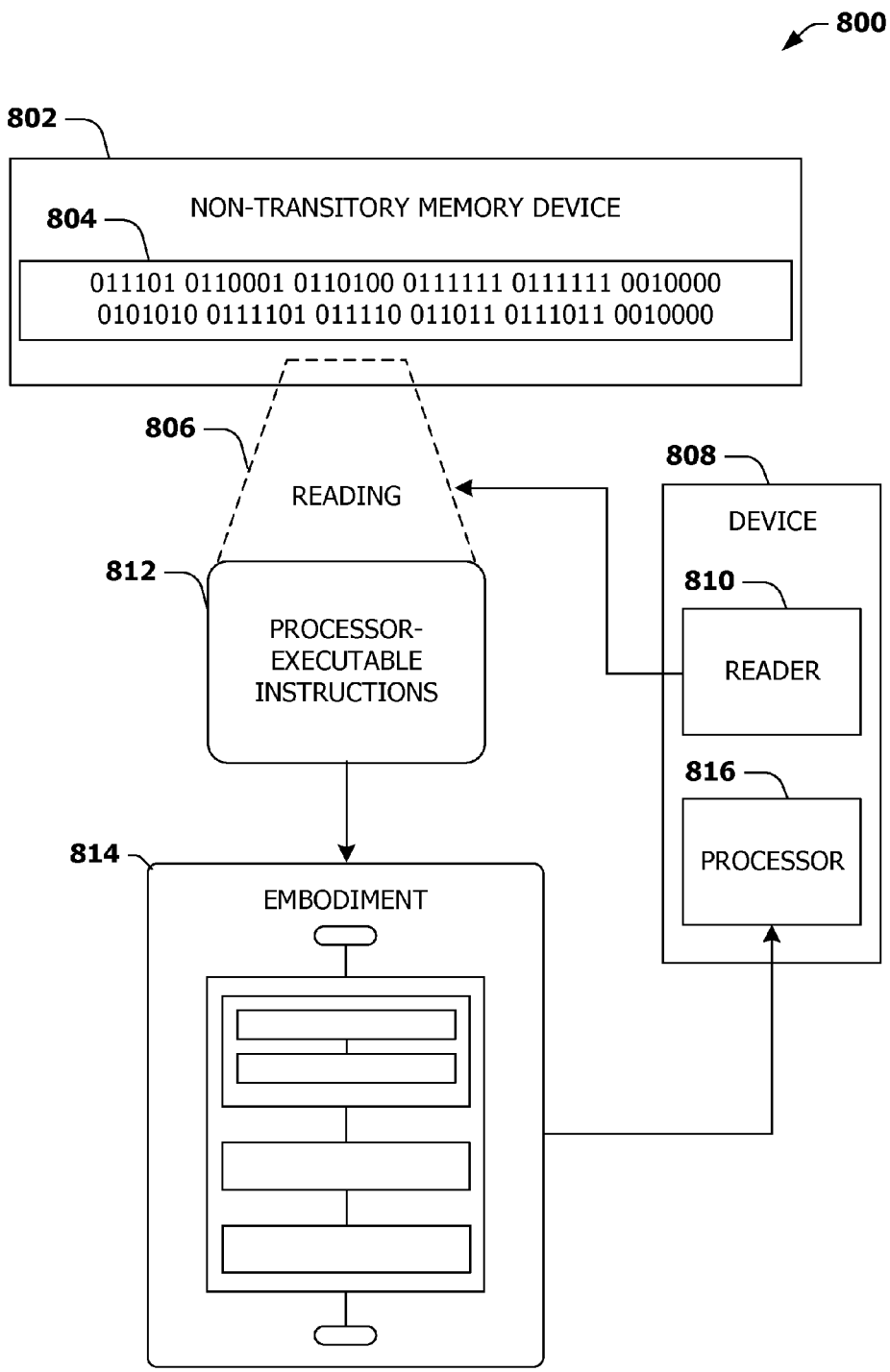
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4 and/or the example method 500 of FIG. 5, for example. In some embodiments, the processor-executable instructions, when executed on the processor 816 of the device 808, are configured to implement a system, such as at least some of the example system 600 of FIGS. 6A-6C, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of geolocation safety awareness, comprising:
determining a location of a client device using a geolocation component of the client device;
searching for safety information about the location, the safety information derived from one or more databases accessed via a network;
computing, using a processor comprising hardware, a threat level based upon one or more safety-related incidents determined to have occurred at least one of at the location or within a threshold distance of the location based upon the safety information;
determining whether the threat level exceeds a threat threshold;
performing a security operation when the threat level exceeds the threat threshold, the security operation comprising:
presenting a warning notice on the client device; and
activating a security timer, the security timer used to at least one of intermittently or periodically evaluate the safety of a user of the client device,
the activating a security timer comprising:
setting a check-in time for the user; and
in response to determining a failure of the user to check-in by the check-in time, notifying an emergency contact;
receiving a passcode input into the client device in association with the security timer;
in response to determining that the passcode input into the client device matches a check-in passcode, deactivating the security timer; and
in response to determining that the passcode input into the client device matches an emergency passcode different than the check-in passcode, notifying the emergency contact.

2. The method of claim 1, the location determined by the geolocation component using at least one of a global positioning system, a mobile phone network or a local area wireless network.

3. The method of claim 1, the computing a threat level comprising:
computing a first threat level for a first type of threat associated with the location; and
computing a second threat level for a second type of threat associated with the location.

4. The method of claim 3, comprising:
computing a first baseline security state for the first type of threat based upon a home region of the user; and
computing a second baseline security state for the second type of threat based upon a home region of the user.

5. The method of claim 4, comprising:
setting a first threat threshold based on the first baseline security state; and
setting a second threat threshold based on the second baseline security state.

6. The method of claim 5, the determining comprising:
determining whether the first threat threshold exceeds the first threat level; and
determining whether the second threat threshold exceeds the second threat level.

7. The method of claim 6, performing the security operation when at least one of:
the first threat threshold exceeds the first threat level; or
the second threat threshold exceeds the second threat level.

8. The method of claim 1, wherein the one or more safety-related incidents comprise at least one of a crime, an incident of civil unrest, a disease outbreak, or inclement weather.

9. The method of claim 1, wherein the security operation comprises at least one of:
the presenting a warning notice when a difference between the threat level and the threat threshold is less than a first threshold; or
the activating a security timer when the difference between the threat level and the threat threshold is greater than the first threshold.

10. The method of claim 1, the warning notice comprising at least one of:
a type of threat;
a route away from a threat; or
a recommendation on how to react to the threat.

11. The method of claim 1, the security timer used to periodically evaluate the safety of the user.

12. The method of claim 1, the notifying an emergency contact comprising:
notifying the emergency contact of a last known location of the client device.

13. The method of claim 1, comprising:
in response to determining that the passcode input into the client device matches the emergency passcode, deactivating the security timer.

14. The method of claim 1, comprising determining the failure of the user to check-in responsive to not receiving the check-in password by the check-in time.

15. A system of geolocation safety awareness, comprising:
a processor comprising hardware; and
memory comprising processor-executable instructions that when executed by the processor cause the processor to:
determine a baseline security state for a user based upon a home region of the user, the home region of the user determined using a geolocation component of a client device;
determine a location of the client device, not within the home region of the user, using the geolocation component of the client device;
search for safety information about the location, the safety information derived from one or more databases;
determine a threat level based upon safety-related incidents determined to be associated with the location based upon the safety information;
set a threat threshold based on the baseline security state;
determine whether the threat level exceeds the threat threshold;
perform a security operation when the threat level exceeds the threat threshold, the security operation comprising:
activating a security timer, the security timer used to at least one of intermittently or periodically evaluate the safety of the user of the client device;

receive a passcode input into the client device in association with the security timer;

in response to determining that the passcode input into the client device matches a check-in passcode, deactivate the security timer; and in response to determining that the passcode input into the client device matches an emergency passcode different than the check-in passcode, notify an emergency contact.

16. The system of claim 15, the security operation comprising presenting a warning notice on the client device, the warning notice comprising at least one of:

a type of threat;

a route away from a threat; or a recommendation on how to react to the threat.

17. The system of claim 15, the security operation comprising presenting a warning notice on the client device, the warning notice comprising a route away from a threat.

18. A non-transitory computer readable medium comprising computer executable instructions that when executed by a processor comprising hardware perform a method for geolocation safety awareness, comprising:

determining a location of a client device;

searching for safety information about the location;

computing a first threat level for a first type of threat associated with the location based upon one or more safety-related incidents, associated with the first type of threat, determined to be associated with the location based upon the safety information;

computing a second threat level for a second type of threat associated with the location based upon one or more safety-related incidents, associated with the second type of threat, determined to be associated with the location based upon the safety information;

computing a first baseline security state for the first type of threat based upon a home region of a user using home information derived from one or more databases accessed via a network;

computing a second baseline security state for the second type of threat based upon the home region of the user;

setting a first threat threshold based on the first baseline security state;

setting a second threat threshold based on the second baseline security state;

determining whether the first threat threshold exceeds the first threat level;

determining whether the second threat threshold exceeds the second threat level;

performing a security operation when at least one of the first threat level exceeds the first threat threshold or the second threat level exceeds the second threat threshold, the security operation comprising activating a security timer, the security timer used to at least one of intermittently or periodically evaluate the safety of a user of the client device;

receiving a passcode input into the client device in association with the security timer;

in response to determining that the passcode input into the client device matches a check-in passcode, deactivating the security timer; and in response to determining that the passcode input into the client device matches an emergency passcode different than the check-in passcode, notifying an emergency contact.

19. The non-transitory computer readable medium of claim 18, the security operation comprising presenting a warning notice on the client device, the warning notice comprising at least one of:

a type of threat;

a route away from a threat; or a recommendation on how to react to the threat.

20. The non-transitory computer readable medium of claim 18, the activating a security timer comprising:

providing a request to execute the security timer to a server connected to the client device via a network.

* * * * *